United States Patent [19]

Sanderson

[11] Patent Number: 4,643,847

[45] Date of Patent: Feb. 17, 1987

[54] METHOD OF IMPROVING THE COLOR OF TALL OIL ROSIN

[75] Inventor: Thomas F. Sanderson, New Castle County, Del.

[73] Assignee: Hercules Incorporated, Wilmington, Del.

[21] Appl. No.: 797,081

[22] Filed: Nov. 12, 1985

[51] Int. Cl.$^4$ ............................ C09F 1/00; C09F 3/00
[52] U.S. Cl. .................................... 260/97.7; 260/97; 260/107; 260/111
[58] Field of Search ...................... 260/97, 97.5, 97.6, 260/97.7, 107, 111

[56] References Cited

U.S. PATENT DOCUMENTS

| | | | |
|---|---|---|---|
| 1,715,085 | 5/1929 | Kaiser et al. | 260/111 |
| 1,715,086 | 5/1929 | Humphrey | 260/111 |
| 1,715,088 | 5/1929 | Kaiser et al. | 260/111 |
| 2,283,156 | 5/1942 | Martin | 260/111 |
| 2,774,753 | 12/1956 | Howard | 260/107 |
| 3,277,072 | 10/1966 | Patrick et al. | 260/97.5 |
| 3,417,071 | 12/1968 | Wheelus | 260/107 |
| 3,551,404 | 12/1970 | Watkins | 260/97.6 |
| 4,222,933 | 9/1980 | Alford | 260/107 |

*Primary Examiner*—Herbert S. Cockeram
*Attorney, Agent, or Firm*—Joanne L. Horn

[57] ABSTRACT

Disclosed is a method of improving the color of tall oil rosin comprising the sequential steps of (a) solvent refining the tall oil rosin by (i) partitioning the tall oil rosin between an immiscible solvent system containing at least one non-polar solvent and one polar solvent, (ii) separating the polar solvent phase from the non-polar solvent phase, (iii) adding additional polar solvent to the resulting non-polar solvent phase, (iv) separating the polar solvent phase from the non-polar solvent phase and (v) removing the non-polar solvent; and (b) distilling the residue. The resultant tall oil rosin is about five color grades lighter than the starting tall oil rosin. Both the improved tall oil rosin and the esters produced therefrom are useful in the manufacture of a variety of products, such as paper and textile sizes, plasticizers for polyolefin films, paints, varnishes, hot melt adhesives and pressure sensitive adhesives.

18 Claims, No Drawings

METHOD OF IMPROVING THE COLOR OF TALL OIL ROSIN

This invention relates to tall oil rosin having improved color, the method of improving its color and to the rosin esters produced therefrom.

The use of a selective solvent refining process to improve the color of wood rosin by removing certain visible dark color bodies and latent color bodies from the wood rosin is disclosed in U.S. Pat. No. 1,715,085, the disclosures of which are incorporated by reference. The disclosed process comprises the formation of a solution of gasoline, rosin and furfural ($C_5H_4O_2$), its cooling or refrigeration with resultant separation of furfural and coloring bodies, and the recovery of high grade rosin from the remaining solution. The wood rosin may be subjected to distillation prior to the solvent extraction.

Tall oil and crude wood rosin contain color bodies or coloring matter visible to the naked eye and certain color bodies which are not normally visible to the naked eye, usually referred to as latent color bodies. In crude wood rosin, the latent color bodies have a tendency to darken and discolor the wood rosin when such color bodies are exposed to the action of air and an alkali, as for example, when the wood rosin is saponified. For tall oil rosin, latent color bodies contained therein do not color the tall oil rosin until the rosin is treated with pentaerythritol or other polyols to form an ester, or treated in the presence of oxygen, such as in the manufacture of hot melt adhesives. Gum rosin does not appear to contain latent color bodies.

The visible coloring matter in a tall oil, wood or gum rosin determines its grade and hence its value. The darker the rosin, the lower its grade and value. The presence of invisible or latent color bodies, while not affecting the apparent grade, is highly disadvantageous in the case of tall oil rosin since they render the polyol esters produced therefrom undesirable for use in the production of products where palest color of the product and retention of color are desired.

Typically, for example, the color of the tall oil rosin goes from an initial color of WW to a color of H (six color grades) during esterification with pentaerythritol and one color grade with glycerine. On the other hand, wood rosin actually improves during esterification at least with pentaerythritol, and gum rosin does not degrade in color upon esterification with polyols.

According to the present invention, there is provided a method of improving the color of tall oil rosin comprising the sequential steps of (a) solvent refining the tall oil rosin by (i) partitioning the tall oil rosin between an immiscible solvent system containing at least one non-polar solvent and one polar solvent, (ii) separating the polar solvent phase from the non-polar solvent phase, (iii) adding additional polar solvent to the resulting non-polar solvent phase, (iv) separating the polar solvent phase from the non-polar solvent phase and (v) removing the non-polar solvent; and (b) distilling the residue. The tall oil rosin produced by the particular method of this invention is improved two to four color grades over the color achieved by either solvent refining or distilling the tall oil rosin alone. Further, the improved tall oil rosin of this invention forms a pentaerythritol which is eight color grades lighter and a glycerine ester which is four to five color grades lighter than the same ester produced from a tall oil rosin which has not been treated by either solvent refining or distillation.

Tall oil rosin is isolated from crude tall oil. Crude tall oil is obtained by acidulation of the "black liquor soap" skimmed off the concentrated alkaline digestion liquor washed out of paper pulp in the sulfate or kraft process for the manufacture of paper. The crude tall oil is then subjected to a series of fractional distillations to separate the rosin from the fatty acids and pitch to provide a tall oil rosin having a mixture of rosin and fatty acids. Depending on the cut, the tall oil rosin may have a resin acid content from about 1% to about 99% by weight. For purposes of this invention, tall oil rosin means tall oil rosin having a resin acid content of from about 80% to about 99%, preferably from about 86% to about 94%.

The immiscible solvents useful in the practice of this invention must include one non-polar solvent and one polar solvent. Suitable non-polar solvents include light petroleum distillates, such as gasoline, mineral spirits, $C_{3-14}$ alkanes and $C_{6-12}$ cycloalkanes. Suitable polar solvents include furfural, acetonitrile, $C_{1-6}$ aliphatic alcohols having at least one hydroxyl group, phenols, sulfolane, and methylpyrrolidone.

The tall oil rosin is soluble in the non-polar solvent, while the visible and latent color bodies are more soluble in the polar solvent than in the non-polar solvent.

The rosin color standards used herein are the U.S. Department of Agriculture (USDA) rosin standards which vary from XC (lightest) through XB, XA, X, WW, WG, N, M, K, I, H, G, F, E and D (darkest).

The tall oil rosin is solvent-refined by partitioning between an immiscible solvent system containing at least one non-polar solvent and at least one polar solvent. After the partitioning of certain visible dark bodies and latent color bodies from the tall oil rosin into the polar solvent, the polar solvent phase is separated from the non-polar solvent phase, and the non-polar solvent is evaporated from the tall oil rosin in any conventional manner, such as by steam sparging and steam-heated evaporation, at a temperature above the crystallization temperature of rosin, which is about 155° C., at atmospheric or reduced pressures. For example, steam sparging is typically done at about 170° C. to about 175° C. The residue from the evaporation of this non-polar phase is termed solvent-refined tall oil rosin and has an improved rosin color, usually on the order of one to four color grades. Typically tall oil rosin goes from an initial USDA color grade of M to WG to a final color of WW.

The solvent-refined tall oil rosin is then distilled to remove additional visible color bodies. The latent color formers, plus some visible color bodies, are removed in the solvent refining step, giving a bright yellow colored tall oil rosin. The tall oil rosin is then distilled to remove the yellow color bodies which remain in the distillation vessel. The tall oil rosin distillate has a USDA color of XC.

Conditions typical for the distillation of tall oil rosin are about 150° C. to about 300° C. at pressures of about 0.05 to about 50 mm Hg. Up to 96% of the original charge may be distilled. Oxygen should be excluded as much as possible to avoid oxidation of the rosin. If the tall oil rosin is to be hydrogenated, the distillation of the solvent-refined rosin may be carried out either before or after the hydrogenation step. The hydrogenation may be carried out in the presence of any known hydrogenation catalyst. Typical catalysts include Raney nickel and palladium on a support, such as carbon. When a supported palladium catalyst is used, typically 1% palladium on carbon is employed.

All parts and percentages used in this specification are by weight unless otherwise indicated.

This invention is more particularly described and illustrated by the following specific examples.

Water saturated furfural as used herein means furfural containing the maximum amount of water it can absorb without separation into distinct layers. This is well known to those skilled in the art.

EXAMPLE 1

This example illustrates the preparation of a tall oil rosin having improved color by the method of this invention.

A reaction vessel is charged with 600 parts of tall oil rosin having a USDA color of WG and a resin acid content of 91%, 1400 parts of gasoline and 400 parts of water saturated furfural. The contents of the vessel are heated to about 50° C. with agitation until the tall oil rosin is dissolved. The resulting mixture is then transferred to a separatory funnel, shaken for about two minutes and placed in a tap water bath for 30 minutes. The funnel is allowed to stand until the mixture separates into two phases. The upper gasoline phase is then transferred to another separatory funnel and 400 parts of water saturated furfural is added. This mixture is then shaken for about two minutes, and the funnel is allowed to stand until the mixture separates into two phases. The upper gasoline phase is then transferred to another vessel. This gasoline phase is then solvent stripped by steam sparging at a temperature of about 170° C. to about 175° C. at atmosperic pressure for about 6 minutes to provide a solvent-extracted tall oil rosin having a USDA color of WW.

A vessel fitted with a magnetic stir bar, a thermometer and a receiver is charged with 600 parts of the solvent-refined tall oil rosin. The vessel is flushed with nitrogen and the rosin heated to 200° C. The vessel is then evacuated via a mechanical pump which is attached to the receiver, and the temperature is gradually raised under 1 mm Hg pressure to a temperature of about 210° C., and the rosin begins to distill. Distillation is complete in about 45 minutes. Five hundred fifty-two (552) parts of tall oil rosin product is recovered and has a USDA color of XC.

EXAMPLE 2

This example illustrates the preparation of the pentaerythritol ester of the improved tall oil rosin of this invention.

A reaction vessel, fitted with a short fractionation column, distillation head and receiver for the collection of water and a thermometer to monitor the rosin temperature, is charged with 100 parts of the improved tall oil rosin having a USDA color of XC of Example 1, 12.7 parts pentaerythritol and 0.2 parts calcium formate catalyst. The mixture is heated under inert atmosphere to 285° C. and is stirred until the acid number (acid number is equal to the milligrams of normalized potassium hydroxide in a methanol solution required to titrate 1 g of rosin) drops to a value of 10 to 16 (about 8 hours). One hundred seven (107) parts of the pentaerythritol ester of the tall oil rosin is recovered having a USDA color of XA.

EXAMPLE 3

This example illustrates the preparation of the glycerol ester of the improved tall oil rosin of this invention.

The procedure and ingredients of Example 2 is used except that 18.5 parts glycerol is used instead of 12.7 parts pentaerythritol, and except that the mixture is heated to 240° C. for 30 minutes, and then the temperature is raised to 275° C. until the acid number drops to 3 to 9 (about 10 hours). One hundred ten (110) parts of the glycerol ester of tall oil rosin is recovered having a USDA color of XB.

EXAMPLE 4

This example illustrates another embodiment of this invention.

One hundred (100) parts of the improved tall oil rosin having a USDA color grade of XC of Example 1 is hydrogenated at 230° C. to 240° C. and 5,000 psig hydrogen over a bed of Raney nickel catalyst. The pentaerythritol ester is prepared according using the ingredients and procedure of Example 2, except that 100 parts of the hydrogenated tall oil rosin of this example is used instead of 100 parts of the improved tall oil rosin having a USDA color of XC of Example 1.

The pentaerythritol ester has a USDA color of XA.

EXAMPLE 5

This example illustrates another embodiment of this invention.

One hundred (100) parts of the tall oil rosin produced by the solvent refining procedure of Example 1 prior to the distillation step is hydrogenated at 230° C. to 240° C. and 5,000 psig hydrogen over a bed of Raney nickel catalyst. The resulting hydrogenated tall oil rosin is then distilled as set forth in Example 1 and esterified according to the ingredients and procedure of Example 2. The pentaerythritol ester has a USDA color of XA.

COMPARATIVE EXAMPLE 6

This comparative example illustrates the formation of a pentaerythritol ester from tall oil rosin which has not been solvent refined and then distilled according to this invention.

A reaction vessel, fitted with a short fractionation column, distillation head and receiver for the collection of water and a thermometer to monitor the rosin temperature, is charged with 100 parts of tall oil rosin having a USDA color of WW, 12.7 parts pentaerythritol and 0.2 parts calcium formate catalyst. The resulting mixture is heated under inert atmosphere to 285° C. and is stirred until the acid number (acid number is equal to the milligrams of normalized potassium hydroxide in a methanol solution required to titrate 1 g of rosin) drops to a value of 10 to 16 (about 8 hours). One hundred seven (107) parts of the pentaerythritol ester of the tall oil rosin is recovered having a USDA color of H.

COMPARATIVE EXAMPLE 7

This comparative example illustrates the distillation of tall oil rosin which has not been solvent-refined according to this invention.

A vessel fitted with a magnetic stir bar, a thermometer and a receiver is charged with 600 parts of tall oil rosin having a USDA color of WG and a resin acid content of 91%, which has not been solvent-refined. The vessel is flushed with nitrogen and the rosin heated to 200° C. The vessel is then evacuated via a mechanical pump which is attached to the receiver, and the temperature is gradually raised under 1 mm Hg pressure to a temperature of about 210° C., and the rosin begins to distill. Distillation is complete in about 45 minutes. Five hundred fifty-two (552) parts of tall oil rosin product is recovered and has a USDA color of XA.

COMPARATIVE EXAMPLE 8

This example illustrates the preparation of the pentaerythritol ester of the distilled tall oil rosin of Comparative Example 7.

The procedures and ingredients of Example 2 are used except that 100 parts of the distilled tall oil rosin having a USDA color of XA of Comparative Example 7 are used instead of 100 parts of the improved tall oil rosin having a USDA color of XC of Example 1. One hundred seven (107) parts of the pentaerythritol ester of the tall oil rosin is recovered having a USDA color of K.

COMPARATIVE EXAMPLE 9

This comparative example illustrates the solvent-refining of tall oil rosin absent the subsequent distillation.

A reaction vessel is charged with 600 parts of tall oil rosin having a USDA color of WG and a resin acid content of 91%, 1400 parts of gasoline and 400 parts of water saturated furfural. The contents of the vessel are heated to about 60° C. with agitation until the tall oil rosin is dissolved. The resulting mixture is then transferred to a separatory funnel, shaken for two minutes and placed in a tap water bath for 30 minutes. The funnel is allowed to stand until the mixture separates into two phases. The upper gasoline phase is then transferred to another separatory funnel and 400 parts of water saturated furfural is added. This mixture is then shaken for about two minutes, and the funnel is allowed to stand until the mixture separates into two phases. The upper gasoline phase is then transferred to another vessel. This gasoline phase is then solvent stripped by steam sparging at a temperature of about 170° C. to about 175° C. at atmospheric pressure for about 6 minutes to provide a solvent-extracted tall oil rosin having a USDA color of WW.

COMPARATIVE EXAMPLE 10

This example illustrates the preparation of the pentaerythritol ester of the solvent-refined tall oil rosin of Comparative Example 9.

The procedures and ingredients of Example 2 are used except that 100 parts of the solvent-refined tall oil rosin having a USDA color of WW of Comparative Example 9 are used instead of 100 parts of the improved tall oil rosin having a USDA color of XC of Example 1. One hundred seven (107) parts of the pentaerythritol ester of the tall oil rosin is recovered having a USDA color of WG.

Thus, this invention provides a method for improving the color of tall oil rosin and the polyol esters produced from the improved tall oil rosin. The tall oil rosin thus produced and rosin esters produced therefrom are useful in a variety of applications, such as paper and textile sizes, plasticizers for polyolefin films, paints, varnishes, hot melt adhesives and pressure sensitive adhesives.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A method of improving the color of tall oil rosin consisting essentially of the sequential steps of:
   (a) solvent refining the tall oil rosin by
      (i) partitioning the tall oil rosin between an immiscible solvent system containing at least one non-polar solvent and one polar solvent,
      (ii) separating the polar solvent phase from the non-polar solvent phase,
      (iii) adding additional polar solvent to the resulting non-polar solvent phase,
      (iv) separating the polar solvent phase from the non-polar solvent phase, and
      (v) removing the non-polar solvent by evaporation; and
   (b) distilling the residue from the non-polar solvent removal.

2. The method of claim 1 wherein the non-polar solvent is selected from the group consisting of a light petroleum distillate, mineral spirits, $C_{3-14}$ alkanes and $C_{6-12}$ cycloalkanes.

3. The method of claim 1 wherein the polar solvent is selected from the group consisting of furfural, acetonitrile $C_{1-6}$ aliphatic alcohols, phenols, sulfolane, and methylpyrrolidone.

4. The method of claim 1 wherein the distillation is carried out at a temperature of about 150° to about 300° C.

5. The method of claim 1 which further comprises the step of hydrogenating the solvent-refined tall oil rosin of step (a) prior to distilling the hydrogenated solvent-refined tall oil rosin according to step (b).

6. The method of claim 1 which further comprises the step of hydrogenating the tall oil rosin after step (b) is complete.

7. The method of claim 1 which further comprises the step of esterifying the tall oil rosin with a polyol after step (b) is complete.

8. The method of claim 5 which further comprises the step of esterifying the hydrogenated tall oil rosin with a polyol after step (b) is complete.

9. The method of claim 6 which further comprises the step of esterifying the hydrogenated tall oil rosin with a polyol.

10. A product produced by the method of claim 1.
11. A product produced by the method of claim 2.
12. A product produced by the method of claim 3.
13. A product produced by the method of claim 4.
14. A product produced by the method of claim 5.
15. A product produced by the method of claim 6.
16. A product produced by the method of claim 7.
17. A product produced by the method of claim 8.
18. A product produced by the method of claim 9.

* * * * *